United States Patent [19]

Hall

[11] Patent Number: 5,005,309

[45] Date of Patent: Apr. 9, 1991

[54] INSTRUMENTED DRIFT FISH AGGREGATING DEVICE AND METHOD

[76] Inventor: John D. Hall, 2255 Ygnacio Valley Rd., Ste M-1, Walnut Creek, Calif. 94598

[21] Appl. No.: 398,778

[22] Filed: Aug. 25, 1989

[51] Int. Cl.$^5$ .......................................... A01K 91/00
[52] U.S. Cl. ....................................................... 43/4
[58] Field of Search ................... 43/4, 4.5, 17.1, 17.5, 43/44.99

[56] References Cited

U.S. PATENT DOCUMENTS

| | | | |
|---|---|---|---|
| 2,612,718 | 10/1952 | Steinberg | 43/44.99 |
| 2,984,208 | 5/1961 | Kopietz | 43/44.99 |
| 3,478,460 | 11/1969 | Kimble | 43/4.5 |
| 3,488,876 | 1/1970 | Lowrance | 43/4.5 |
| 3,680,245 | 8/1972 | Brooks | 43/44.99 |
| 4,471,552 | 9/1984 | McIntosh | 43/4.5 |
| 4,672,764 | 6/1987 | Dempsey | 43/4 |
| 4,727,672 | 3/1988 | Hill | 43/4 |
| 4,916,845 | 4/1990 | Aydelette | 43/4 |

OTHER PUBLICATIONS

National Marine Fisheries Service, Workshop, p. 4, (11–12 Oct. 1988).
McIntosh trade literature on Sea-Kites, two pages.
Murray et al., using FAD's to Attract Fish, Marine Fisheries Review (1987).
Shomura, et al., NOAA Tech. Manual, Structured Flotsam, pp. 1 and 4 (Oct. 1982).
Hallier, Purse Seining on Debris Associated Schools, pp. 150–155 (1985).
Brock, Fish Aggregation Devices: How They Work, pp. 193, 194, 196 (1985).
Guillen et al., Anchored Raft Experiment, pp. 3, 6, 8 and Addendum (1981).
1987 Annual Report of the Inter-American Tropical Tuna Commission, pp. 36 and 88 (1988).
Brock, Preliminary Study of the Feeding Habits of Pelagic Fish, pp. 40 and 48 (1985).

Primary Examiner—Kurt Rowan
Attorney, Agent, or Firm—Baker, Maxham, Jester & Meador

[57] ABSTRACT

An instrumented drift fish aggregating device to attract game fish for harvest. A highly positive flotation buoy with instrumentation including visual and radio acquisition devices floats on the water. Suspended from the buoy are a plurality of suspension lines connected to a ballast weight, which combine for stability of the buoy. A multiplicity of fish attraction streamers are connected to the suspension lines. The device can provide information to a remote location, such as a fishing vessel, by radio means as to its location, water temperature and quantity of fish in the vicinity of the buoy.

22 Claims, 1 Drawing Sheet

5,005,309

INSTRUMENTED DRIFT FISH AGGREGATING DEVICE AND METHOD

FIELD OF THE INVENTION

This invention relates generally to the fishing industry and more particularly to a locatable, floating device to attract game fish for harvest by commercial and recreational fishermen.

BACKGROUND OF THE INVENTION

Fishermen have long known that materials floating on the ocean surface, especially in tropical waters, attract many species of game and forage fish. Natural materials known to attract fish have included logs, palm fronds, bamboo, shipping crates and other flotsam, as well as living organisms, such as porpoises and dolphins. Commercial and recreational fishermen have taken advantage of these aggregations of floating materials and game fish by fishing near the floating material in order to catch the associated fish.

As will be readily recognized, this is fishing by mere happenstance, where the "luck" is enhanced by the chance occurrence of floating materials and the further chance that those floating materials may have attracted desirable fish.

SUMMARY OF THE INVENTION

Broadly speaking, this invention is a device for attraction of pelagic game fish having means to locate the device and, in alternative embodiments, means to indicate to the fishermen data on the quantity of fish which the device has attracted.

The device comprises a flotation buoy having appropriate instrumentation mounted thereto, a plurality of ballast suspension lines extending downwardly from the buoy and connected to a ballast weight. The combination of suspension cables and ballast weight provide stability to the buoy. Additionally, streamers are attached to the suspension lines for enhanced attraction of fish.

The instrumentation mounted to the buoy include various combinations of a strobe light for visual location, a radio which may use a satellite system for long distance transmission of location and seawater temperature data, and an acoustic link which, together with the radio, sends fathometer data on the quantity of fish attracted by the device. This last information enables the fishermen to determine whether to harvest the fish associated with a particular buoy or whether it is not worth the final specific location determination and movement through the water in that direction.

BRIEF DESCRIPTION OF THE DRAWING

The objects, advantages and features of this invention will be more clearly perceived from the following detailed description when read in conjunction with the accompanying drawing, in which.

DESCRIPTION OF THE PREFERRED EMBODIMENTS

Figure 2:
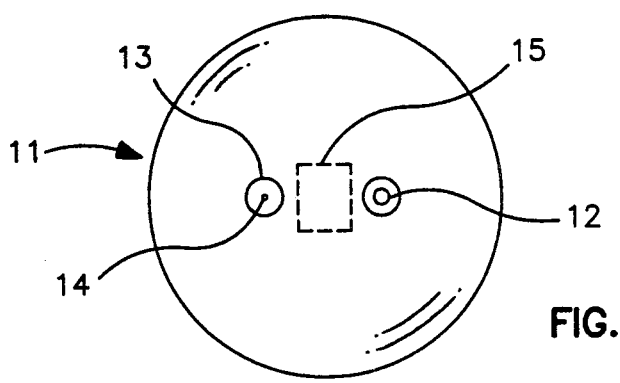
FIG. 2 is a top view of the embodiment of the device of FIG. 1.
Figure 1:
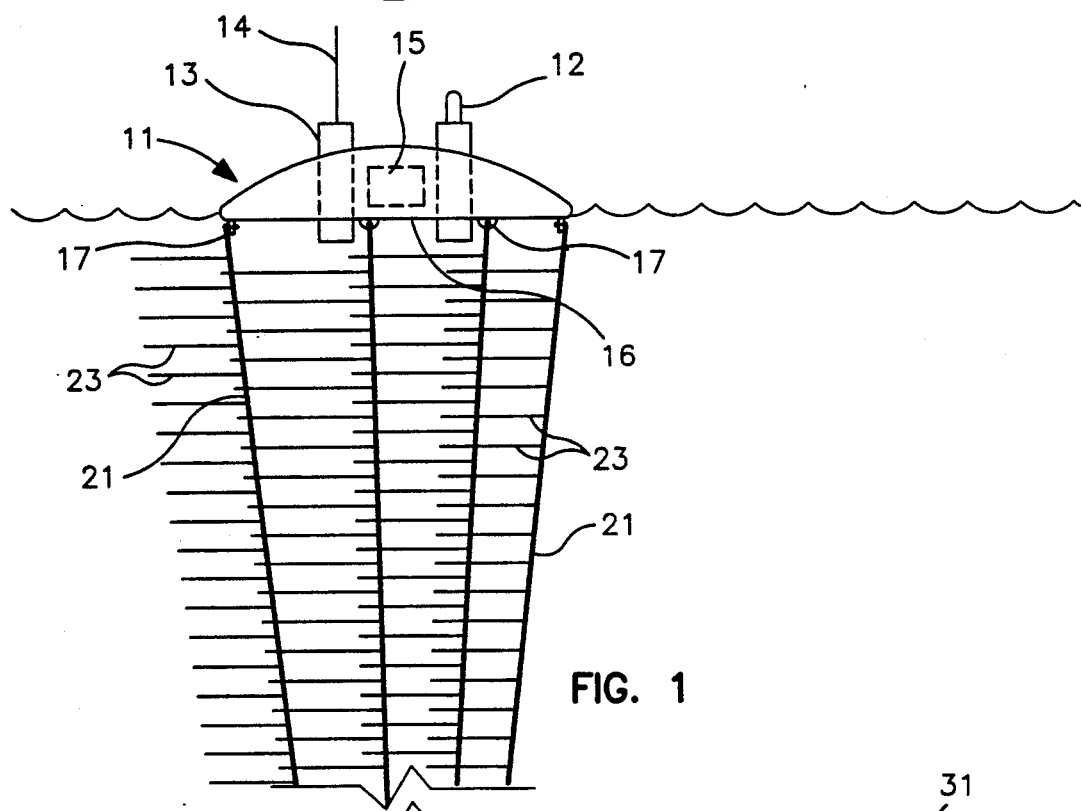
FIG. 1 is an elevation view of the device of this invention.

With reference now to the drawing, flotation buoy 11 is shown as a circular device made from highly positive flotation materials. Mounted in and projecting upwardly from buoy 11 is a visual attraction device such as strobe light 12. Also mounted in the buoy and projecting upwardly if necessary are other instrumentation elements such as radio transmitter 13 having antenna 14 projecting upwardly therefrom. Other instrumentation and a power source such as a solar rechargeable battery are indicated by reference numeral 15.

Around the periphery of bottom surface 16 of the buoy are mounting tabs 17 to which are secured the upper ends of ballast suspension lines or cables 21. The opposite end of the suspension lines are adhered to ballast weight 22 hanging directly under buoy 11. Secured to the suspension lines at spaced intervals are a multiplicity of light weight, elongated streamers 23 employed for attracting fish. These streamers function to some extent as an aggregation of seaweed.

Figure 3:
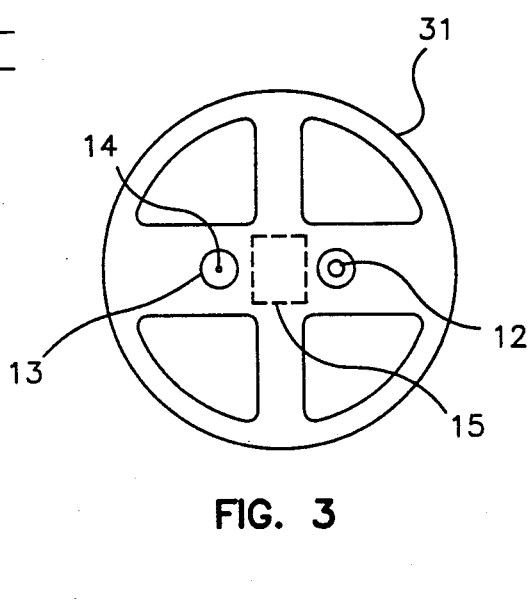
FIG. 3 is a top view of an alternative embodiment of the invention of FIG. 1.

For purposes of illustration particular materials and sizes will be set forth, but these are by way of example only and do not constitute limitations. Buoy 11 is a low-profile disc-like floating device, preferably having 25-50 square feet of top surface area. It may be approximately six to eight feet in diameter and is preferably made from polyurethane foam-filled fiberglass and PVC materials, thus being exceptionally durable and having a high positive flotation coefficient. The buoy shown in FIG. 2 is a solid disc, while buoy 31 shown in FIG. 3 has open architecture with voids designed into the disc. The other elements would be as already described. The suspension lines are preferably made of steel but any other material which performs the desired function could be used. The suspension cables are preferably about four times longer than the diameter of the buoy in order to provide a highly stable beam/draft ratio. Their length may range from 20-35 feet. Ballast weight 22 is preferably 20-25 percent of the positive flotation provided by the buoy. The buoy preferably has a positive flotation of 200-350 pounds while the ballast is 50-80 pounds. Plastic fish attraction streamers 23, which act as artificial seaweed and provide additional habitat for fish, are attached by suitable means to the steel ballast suspension cables at regular intervals. The instruments may be operated on a photosensor switch and timing circuit, they may be enabled remotely by the fishermen using a shipboard transceiver, or they may operate at a preassigned repetition rate.

The instrumented surface drifting buoys of this invention are deployed by fishermen in tropical and subtropical seas and allowed to drift on the surface of the ocean. While drifting, these devices attract several species of pelagic game fish, including tunas, wahoo, marlin, jacks and dolphin, as well as many species of small fish that act as prey for the larger predatory species. This invention also attracts forage and game fish by providing shelter for small fish, shade for fish of all sizes, and it also acts a surface reference in the open ocean environment.

As indicated previously, the instrumentation is mounted in the vicinity of the center of buoy 11 and is powered by batteries, the charge on which may be maintained by solar powered electrical cells. The instrumentation permits fishermen to use special radio and satellite receivers to locate the fish aggregating devices of the invention. Strobe light 12 may be a xenon strobe unit mounted on a short mast with a selectable timing circuit and photosensor switch to activate the light. The estimated visual range in clear weather from the buoy to a shipboard observer is about six miles. In addition to the strobe light, the buoy of the invention may use other instrumentation. When combined with a radio, the instrumentation could be referred to as a multimodal satellite radio and strobe light version. This model employs a satellite radio designed for use with a satellite system such as the ARGOS. Radio transmitter unit 13 provides location and seawater temperature data from the buoy to the satellite. At the bottom of the buoy are temperature sensors which provide signals to the transmitter which are indicative of water temperature. The temperature data may be transmitted periodically or stored for later transmission along with the position data signal. The satellite in turn transmits the location and temperature data to the fishermen through a satellite receiver on board a fishing boat. When approaching the vicinity of the buoy, the strobe light would be used for final acquisition of the buoy within its visual range.

When using a satellite communication system, the satellite radio transmitter on the buoy sends a radio frequency signal to an orbiting satellite which determines the location of the buoy by Doppler shift detection of the radio signal from the buoy. When using a radio system without a satellite, the buoy transmitter, either an HF or VHF radio, sends the radio signal directly to the automatic direction finder (ADF) in the fishing vessel. The ADF indicates the direction to be steered by the vessel to home in on the buoy.

It is possible to use a stripped down version of the drift fish aggregation device of this invention without any instrumentation. It is not a preferred embodiment but it would be useful if some means, other than "instrumentation," of spotting the device in the water were provided. Such means could be a pole or stiff wire with a flag on top, or a balloon to hold up a wire with a flag. It could be just the balloon itself as a position locating device. The balloon could be treated so as to reflect a radar signal, or be simply a visual indicator.

An acoustic link may be added to the instrumentation and the instrumentation of the device may then make it more appropriately referred to as a multimodal satellite radio, strobe light and acoustic link version. This configuration uses the two instruments mentioned above and an acoustic link. The acoustic link may be termed a fathometer/fish finder. The underside of the buoy, in this embodiment, includes a 50k Hz or 200k Hz acoustic transducer which is connected through appropriate circuitry to the satellite or the HF/VHF radio transmitter. The circuitry turns the transducer on at specific intervals to send sonic pulses into the water beneath the buoy and records the returning echos from fish which have aggregated beneath the device. The echo strength data is stored in the circuitry and transmitted to the satellite or fishing vessel as part of the radio signal which is used for position detection. Thus the buoy can be located visually and by satellite while the acoustic link sends fathometer data on the quantity of fish under the buoy to the fishing vessel so the fishermen know whether or not sufficient quantities of fish are available at a particular fish aggregating device to warrant harvesting. The fish quantity data may be sent over a radio directly to the fishing vessel, or it may be sent by means of the radio by satellite. The fathometer and the temperature sensor are represented by instrument block 15 in the buoy.

Drift fish aggregating devices made in accordance with the invention are thus light weight, extremely durable, surface drifting fish attracting buoys which use a variety of instrumentation systems so they can be relocated and then have the aggregated fish under them harvested by fishermen.

In view of the above description, it is likely that modifications and improvements will occur to those skilled in the art which are within the scope of the accompanying claims.

What is claimed is:

1. A drift fish aggregating device comprising:
buoy means adapted for flotation on the surface of water, said buoy means being non-tethered and having a first or beam dimension normally parallel with the surface of the water;
a plurality of ballast suspension lines, each line connected at one end to said buoy means in the vicinity of the periphery of the buoy and extending downwardly therefrom, the length of said suspension lines defining a draft dimension, the beam to draft ratio being so configured as to create a very stable drifting device;
fish attraction means secured to said ballast lines;
a ballast weight secured to the other ends of said suspension lines and hanging below said buoy means; and
means mounted to said buoy means to facilitate location of said drift fish aggregating device.

2. The drift fish aggregating device recited in claim 1, wherein said location facilitating means comprises instrumentation.

3. The drift fish aggregating device recited in claim 1, wherein said ballast lines are all connected together at said ballast weight.

4. The drift fish aggregating device recited in claim 1, wherein said ballast weight equals 20–25 percent of the positive flotation provided by said buoy means.

5. The drift fish aggregating device recited in claim 1, wherein said buoy means is a low-profile disc-like floating buoy having a circular configuration.

6. The drift fish aggregating device recited in claim 4, wherein the length of said suspension lines ranges between 2.5 and 6 times the diameter of said buoy.

7. The drift fish aggregating device recited in claim 6, wherein the length of said suspension lines is approximately four times the diameter of said buoy.

8. The drift fish aggregating device recited in claim 1, wherein said fish attraction means comprises a multiplicity of streamers.

9. The drift fish aggregating device recited in claim 2, wherein said instrumentation means comprises a strobe light for visual acquisition of said device.

10. The drift fish aggregating device recited in claim 2, wherein said instrumentation means comprises radio means connected to a source of location and temperature data to provide that information to a remote location.

11. The drift fish aggregating device recited in claim 10, wherein said radio means is a satellite radio which provides long range location and temperature data to said remote location by means of a satellite.

12. The drift fish aggregating device recited in claim 11, wherein said instrumentation means comprises a strobe light for visual acquisition of said device.

13. The drift fish aggregating device recited in claim 2, wherein said instrumentation means comprises an acoustic link coupled to means for determining the quantity of fish under said fish aggregating device.

14. The drift fish aggregating device recited in claim 13, wherein said instrumentation means further comprises radio means for transmitting said fish quantity data to a remote receiver.

15. The drift fish aggregating device recited in claim 14, wherein said instrumentation means comprises a strobe light for visual acquisition of said device.

16. The drift fish aggregating device recited in claim 15, wherein said radio means is a satellite radio which provides long range location and temperature data to said remote location by means of a satellite.

17. A drift fish aggregating device comprising:
buoy means adapted for flotation on the surface of water, said buoy means being non-tethered and having a first or beam dimension normally parallel with the surface of the water;
a pluralityof balast suspension lines, each line connected at one end to said buoy means in the vicinity of the periphery of the buoy and extending downwardly therefrom, the length of said suspension lines defining a draft dimension, the beam to draft ratio being so configured as to create a very stable drifting device;
fish attraction streamer means secured to said ballast lines;
a ballest weight secured to the other ends of said suspension lines and hanging below said buoy means; and
light means to facilitate visual acuqisition of said device.

18. The drift fish aggregating device recited in claim 17, wherein said light means is a strobe light.

19. The drift fish aggregating device recited in claim 18, and furthe rcomprising control means for said strobe light to cause illumination thereof of a predetermined schedule.

20. The drift fish aggregating device recited in claim 17, wherein said streamer means comprises a multiplicity of light weight, elongated streamers.

21. A method for aggregating fish at a locatable position in open waters, said method comprising the steps of :

providing a floating body on the water, said floating body being non-tethered and having a first or beam dimension normally parallel with the surface of the water;
providing ballast means comprised of a plurality of lines connected to and extending below the body for maintaining stability of the body, the distance from the body to the ballast means defining a draft dimension, the beam to draft ration being so configured as to create a very stable drifting body;
providing moving steamer means between the body and the ballast means to attract fish; and
visually identifying the location of the body.

22. The method recited in claim 21, and comprising the further steps of:
determining the quantity of fish beneath the body; and
broadcasting the fish quantity information to a remote location.

* * * * *